United States Patent
Peterson et al.

[15] 3,661,263
[45] May 9, 1972

[54] APPARATUS FOR SEPARATING AN OIL SLICK FROM A LARGE BODY OF WATER

[72] Inventors: David L. Peterson, 1121 Arrowhead Rd., Anchorage, Alaska 55803; Clifford M. Cole, Route 6, Box 6197, Bainbridge Island, Wash. 98110

[22] Filed: Nov. 17, 1969

[21] Appl. No.: 877,169

[52] U.S. Cl. ........................................210/242, 210/DIG. 21
[51] Int. Cl. .........................................................C02b 9/02
[58] Field of Search..................210/83, 242, 523, DIG. 21; 61/28; 55/171–175

[56] References Cited

UNITED STATES PATENTS

| | | | |
|---|---|---|---|
| 3,219,190 | 11/1965 | Thune | 210/242 |
| 1,829,544 | 10/1931 | Schilling et al. | 210/523 X |
| 649,355 | 5/1900 | Rhead | 61/28 |
| 2,876,903 | 3/1959 | Lee | 210/242 |
| 2,073,610 | 3/1937 | Danel | 210/242 X |
| 61,880 | 2/1867 | Serrell | 210/242 |
| 575,998 | 1/1897 | Stoltes | 61/28 |
| 3,476,038 | 11/1969 | Dicmas | 210/242 X |
| 3,278,041 | 10/1966 | Wride et al. | 55/174 |

Primary Examiner—Reuben Friedman
Assistant Examiner—T. A. Granger
Attorney—Kimmel, Crowell & Weaver

[57] ABSTRACT

A V-shaped oil slick sweeping system including a log boom as one arm and an oil barge as the other arm, and wherein the barge is outfitted and compartmentalized to receive mixed water and oil, and wherein means is provided on the barge to separate the oil from the water, and to retain the former while discharging the latter.

6 Claims, 5 Drawing Figures

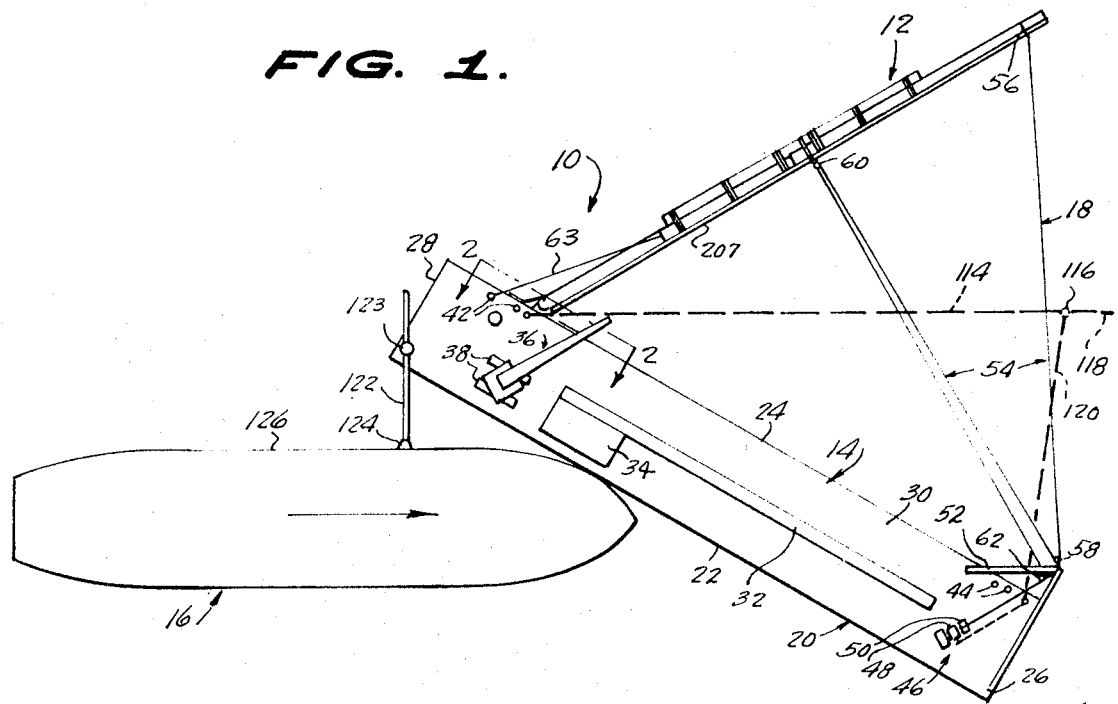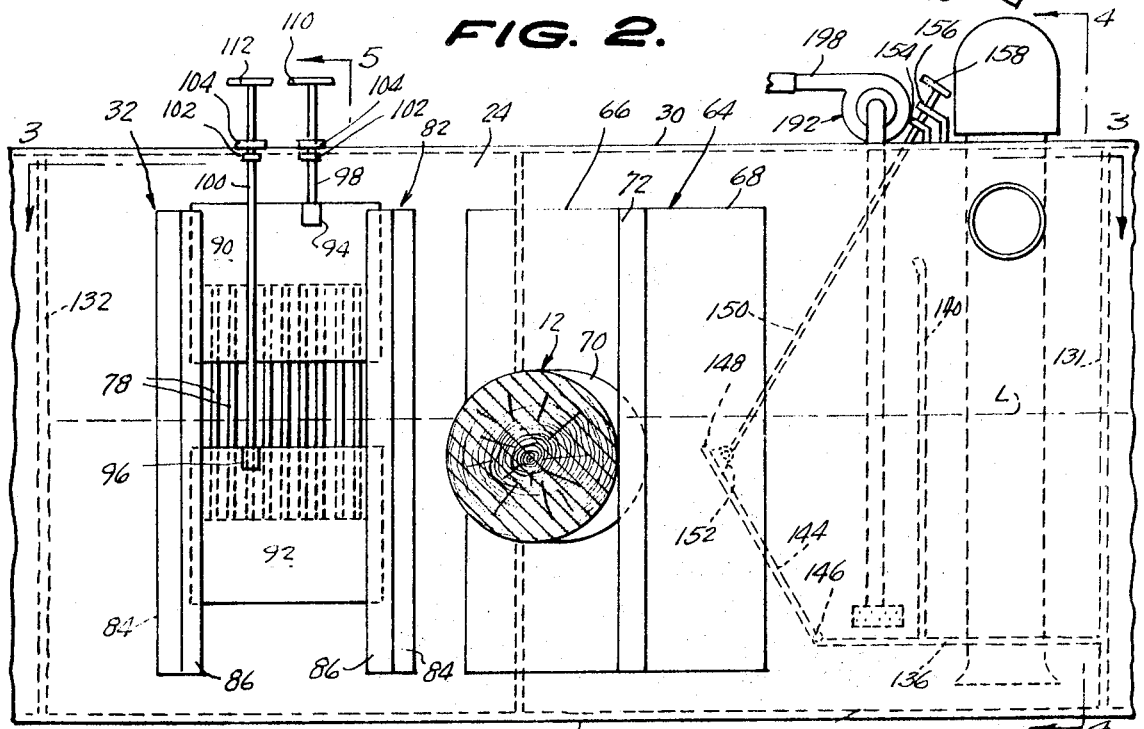

INVENTORS
DAVID L. PETERSON,
CLIFF M. COLE,
BY
Kimmel, Crowell + Weaver
ATTORNEYS.

APPARATUS FOR SEPARATING AN OIL SLICK FROM A LARGE BODY OF WATER

CROSS-REFERENCE TO RELATED APPLICATION

The specific construction of the log boom referred to herein is detailed in our copending application filed Dec. 1, 1969, Ser. No. 881,163, and entitled "LOG BOOM SYSTEM FOR SWEEPING OIL SLICKS FROM A LARGE BODY OF WATER."

BACKGROUND OF THE INVENTION

1. Field of the Invention

This invention relates to liquid collection and separation and, more specifically, to float means in the nature of a barge or scow to receive an oil slick therein, the barge being compartmentalized and provided with pump means to separate the dense water from the less dense oil, and to temporarily store the recovered oil.

2. Description of the Prior Art

National as well as international attention has been recently focused on water pollution as occasioned by the wreckage of large oil tankers and the loss of thousands of gallons of oil as a consequence thereof. The lost oil has, on many occasions, been washed ashore rendering beaches unuseable for vacationers, and with the attendant loss of income for local hotels, restaurants, and other businesses serving tourists and local citizenry. Fowl and marine life also suffer incredible damage on such occasions. Cleanup operations are physically demanding and the costs thereof are high. Again, attention has been shifted to off-shore drilling operations wherein an oil well off the coast of the United States commenced to leak, threatening beach devastation.

While this invention does not pertain to the prevention of such disasters at the site or origin of the polluting source, it does relate to means for effecting the removal of large accumulations of floating oil, and means for processing the captured oil in an effort to recoup some of the capital loss which would otherwise be total.

The prior art takes cognizance of the problem as, for example, the U.S. Pats. to Thune, No. 3,219,190 and to Cornelissen, No. 3,348,690. The patent to Thune is pertinent with respect to the separator means utilized in the present invention, but here the patentee does not have his water pump suction side located under the final sludge weir but appears to depend upon either the forward motion of the vessel relative to the surface or the action of the paddle wheel which seems to function as the pump. In Cornelissen we find a lack of disclosure pertaining to the adjustable weirs and gates or plates, and the lack of the use of the vessel, per se, as an arm of a boom system.

SUMMARY OF THE INVENTION

It is one of the primary objects of this invention to provide an oil barge or scow constructed with a controlled opening in the side of the hull thereof to receive therethrough mixed oil and water for storage in compartments, and wherein apparatus is provided for separating the oil from the water. In the course of separation, the oil is conducted to still other compartments while the separated water is discharged overboard.

The invention further contemplates sweeping the oil slicked water with a V-shaped collector or sweeper system wherein an inexpensive log boom forming one arm of the system is connected with the barge to form the other arm thereof, the arrangement being such that the oil slick is constantly urged in the direction of the apex of the system for delivery through the hull opening which is located adjacent thereto as the system is moved through a body of water. In the practice of this invention, at least a portion of the hull opening is below the surface of the water and means is provided for the control of the liquid flow therethrough.

Utilizing the difference of the specific gravities of the water and the oil, the barge is provided with pump means for pumping the undesired underlying water of heavier density overboard and other pump means for pumping the reclaimed oil into suitable compartments formed in the hull of the vessel.

It is a further major object of this invention to provide sophisticated means for achieving the above noted desired ends through the simplification of apparatus and the minimization of costs.

Other and further objects and advantages of this invention will become more manifest from a consideration of the following specification when read in the light of the accompanying drawings.

BRIEF DESCRIPTION OF THE DRAWINGS

Figure 3:
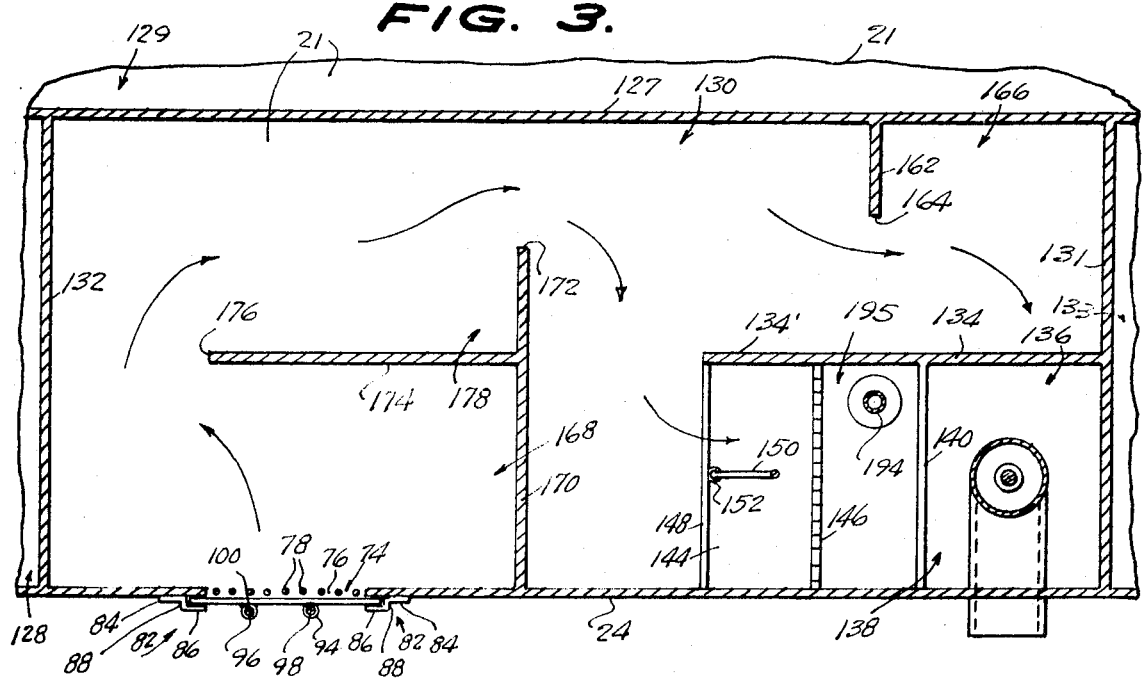
Figure 4:
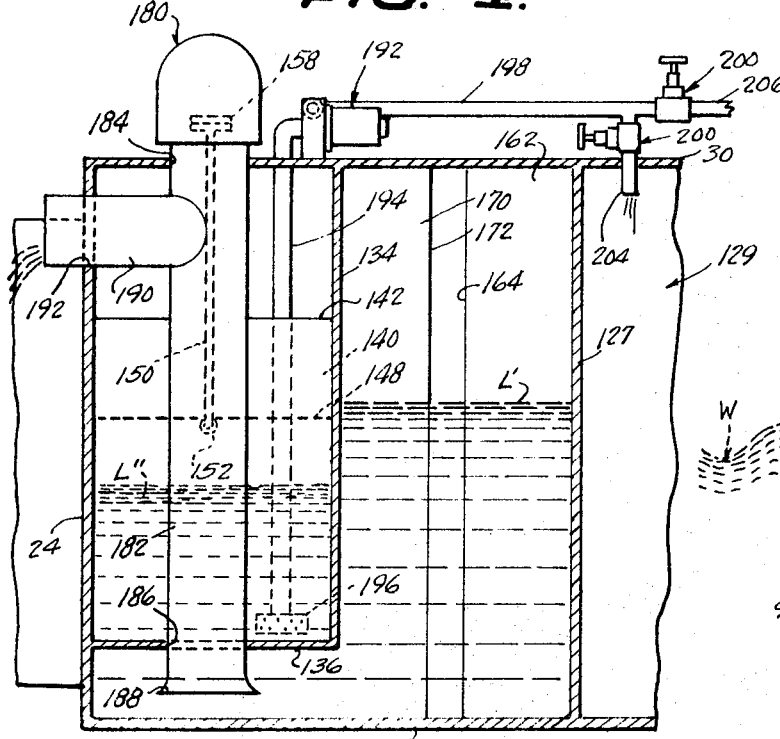
Figure 5:
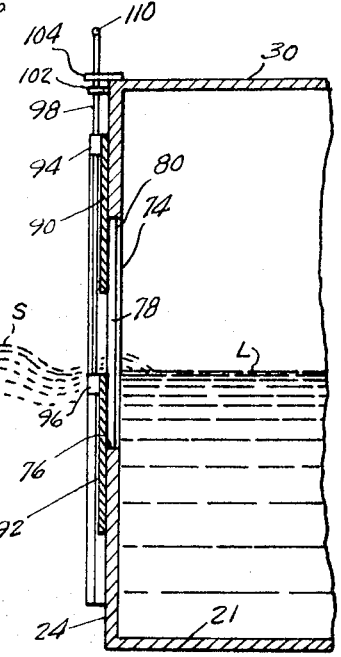

IN THE DRAWINGS:

FIG. 1 is a top plan view of a barge constructed according to this invention, its cooperating log boom, and associated tender in its push-tow position;

FIG. 2 is an enlarged fragmentary side elevational view of the port side of the barge and illustrating the hull opening, its relationship to the log boom, and the relative positions of certain pumps, FIG. 2 being taken substantially on the vertical plane of line 2—2 of FIG. 1, looking in the direction of the arrows;

FIG. 3 is a fragmentary detail cross-sectional view illustrating a number of vessel compartments, pumping equipment, and a fluid flow path through the compartments, FIG. 3 being taken substantially on the horizontal plane of line 3—3 of FIG. 2, looking in the direction of the arrows;

FIG. 4 is a transverse fragmentary detail cross-sectional view, FIG. 4 being taken substantially on the vertical plane of line 4—4 of FIG. 2, looking in the direction of the arrows; and FIG. 5 is a transverse detail cross-sectional view, FIG. 5 being taken on the vertical plane of line 5—5 of FIG. 2, looking in the direction of the arrows.

Referring now more specifically to the drawings, reference numeral 10 designates a V-shaped boom system according to the teachings of this invention. The system may be generally described as comprising a log boom 12 and an oil barge 14. Motive power for the system includes a conventional push-tow tender 16, and tow rigging 18 for connection with a conventional tugboat or other similar vessel. While the system contemplates the use of both the tug and tender for its motive power, either could be used alone, or the tender 16 could be self propelled.

The log boom 12 has been described in detail in my above-referred-to copending patent application, as has the rigging 18. Thus, these components will be herein described to the extent necessary to lend intelligence to this invention.

This invention is primarily concerned with the construction of the barge 14. As is seen in the several Figures of the drawings, the barge 14 comprises a substantially hollow rectangular hull 20 having a bottom wall 21 and opposed upwardly extending side walls 22, 24. Also provided are the usual bow and stern upright walls 26, 28, respectively, all in the conventional manner. A top deck 30 also extends across the upper ends of the side and end walls.

Provided on the top deck 30 and schematically illustrated is a pipe corridor 32, a boiler, generator, radio and warm room 34. At 36 a utility crane is schematically shown, the crane being adapted to ride on rails 38 secured on the deck 30. A plurality of stanchions 42 are positioned on the deck 30 adjacent its stern and port or left side, and similar stanchions 44 are located adjacent the bow and at the same side.

Also mounted on the top deck 30 adjacent its bow end is a windlass 46 which includes a pair of drums 48, 50. Reference numeral 52 designates a conventional outrigger tower also mounted on the top deck 30, and at 54 is indicated a boom control line having one of its ends connected to anchoring means 56 secured to the outer end of the boom 12, and its other end reeved through suitable pulleys 58, 60, 62 for connection to the drum 50 of the windlass 46. A boom retainer line 63 has one of its ends anchored on the boom 12 adjacent its inner end, while the other end of the line 13 is releasably secured to one of the stanchions 42 (which in this case may comprise a conventional capstan).

The inner end of the boom 12 is swingably supported and connected on the port side 24 of the vessel 14 in socket means 64 (described in detail in my copending application, supra). This connection is such that the boom 12 may swing freely horizontally as well as upwardly and downwardly in response to wave motion and in accordance with the desired degree of angularity of the boom 12 with respect to the vessel 14 as set by certain rigging to be described. The socket means also comprises upright guide means whereby the boom may be slidably adjusted vertically relative to the adjacent side wall of the vessel, the adjustment being made automatically and in accordance with the depth the vessel 14 rides in the body of water W. Briefly, the socket means may be generally described as comprising a pair of plates including the plates 66, 68 fixedly secured to the port side of the barge 14 to provide bearing surfaces in which the inner end of the log boom is free to swing. This end of the log boom 12 is provided with a notch 70 in which is freely received a retainer flange 72, the flange being spaced outwardly from the plates 66, 68. The flange 72 together with the plate 66 and components connected therewith serve as a vertical guide means to permit the vertical shifting of the boom 12 relative to the side wall 24 of the barge 14.

The barge 14 is provided with a vertically elongated substantially rectangular transversely extending opening 74 in the port side wall 24 thereof with the opening 74 having its lower end 76 normally located below the surface S of a body of water W under dead calm conditions. A plurality of vertically elongated laterally spaced rods 78 have their respective lower ends fixedly connected to the lower end 76 of the opening 74, and their respective upper ends rigidly secured to the upper end 80 of the opening 74 to form a screen. The screen 74 may be raked to clear it of flotsam whenever necessary.

As is seen in FIGS. 2 and 3, reference numerals 82 each denote a substantially Z-shaped guide each of which comprises an upright foot portion 84 fixedly secured to the side wall 24 spaced outwardly, respectively, from the opposed vertically extending sides of the opening 74. A leg portion is designated by reference numeral 86, the leg portion being disposed in laterally spaced and confronting relationship relative to the vertically extending marginal edge of the wall 24 at each side of the opening 74. The leg portions 86 and the confronting portions of the side wall 24, taken together with the connecting bights 88, serve to form guide means for a pair of elongated substantially rectangular weir plates 90, 92.

Fixedly secured to the outer side of each of the plates 90, 92 is an enlarged boss 94, 96, respectively, and the lower ends of a pair of shafts 98, 100 are fixedly connected with each of the bosses 94, 96, respectively. The upper ends of each of these shafts extend upwardly through identically constructed pairs of conventional friction clamps 102, 104 fixedly connected to the side wall 24 adjacent the top deck 30 and to the top deck 30 in vertically spaced and aligned positions relative to one another and the underlying bosses 94, 96. The upper ends of each of the shafts 98, 100 terminate in conventional handle means 110, 112, respectively, and in the operation of the plates 90, 92 means (not shown) carried on and operated by the crane 36 or other suitable means, is engaged with one of the handles 110, 112, after which a selected one of the friction clamp means 102, 104 is released and the crane 36 operated to effect a vertical movement of a selected one of the plates 90, 92 relative to the other. The selected friction clamp means 102, 104 is then reengaged against the selected one of the shafts 90, 100 to hold the adjusted one of the plates 90, 92 in its adjusted position.

Obviously, other means conventional in the art may be employed to effect the vertical adjustment of the weir plates 90, 92 relative to one another and to the opening 74, and the means described above is by way of example only.

From the foregoing description, it will be understood that adjustment of the plates 90, 92 towards and away from one another will thereby vary the effective area of the opening 74. In FIG. 5 of the drawings, the lower plate 92 has been adjusted in such a manner as to skim slightly below the surface S of an oil slick carried on the body of water W. The upper plate 90 has been adjusted to a position above the plate 92 whereby crests of moderately high waves of the body of water W will pass therebelow and through the opening 74. It is clear from the drawings that as the plates 90, 92 are moved appropriately, the lower edge of the plate 90 will engage the upper edge of the plate 92 to substantially seal the opening 74. Such liquid seepage which may occur therebetween is minimal and of no major concern.

At this point it is deemed to be expedient to depart from a further description of the construction of the barge 14 in order to define the function of the opening 74 and the closure plates 90, 92 therefor. To this end, it will be understood that to be effective as a system for sweeping oil from the surface of a body of water, some motive power must be provided to move the system in the direction of the oil slick. In this case, a towing bridle 114 has one of its ends fixedly connected to one of the stanchions 42, while its other end terminates in a conventional coupler means 116. One end of a towing line 118 is also connected to the coupler 116, and the other end of the towing line 118 is connected to a conventional tug or other similar boat. At 120 is indicated an adjustable leg of the towing bridle having one of its ends connected to the coupler 116, and its other end passes around a selected one of the stanchions 44 for connection to the drum 48.

The drum 50 is actuated to reel in or pay off the line 54, thereby changing the angularity of the boom 12 relative to the barge 14 to decrease or increase the distance therebetween to control the effective sweep of the system, and the drum 48 is actuated to properly position the towing bridle 114 following adjustment of the boom 12.

Reference numeral 122 designates an adjustable strut having one of its ends slidably and rotatably carried on a housing 123 connected on the top deck 30 adjacent the stern and starboard side thereof. The other end of the strut 122 terminates in an enlarged end 124 and this may comprise a fender if desired. Referring specifically to FIG. 1 of the drawings, it is seen that the barge 14 is skewed in such a manner that its starboard side 22 is engaged by the port bow of the tender 14, and the strut 122 also makes engagement with the port side 126 of the tender. The tender 16 is, thus, in a push-tow relationship relative to the barge 14.

As the above-described system is towed through an oil slick on the surface S of the body of water W, the slick is pushed in the direction of the opening 74, and the plates 90, 92 are moved away from one another in such a manner as to permit the less dense oil slick to wash over the upper edge of the plate 92 and into the hull of the barge 14. The lower edge of the plate 90 is raised sufficiently high so as to permit the crest of the oil slick waves to pass thereunder. The described relationship is illustrated in FIG. 5 of the drawings.

Returning now to a specific description of the construction of the barge 14, reference numeral 127 designates a vertically extending elongated bulkhead centrally located between the port and starboard side walls 24, 22, respectively, and from the bow wall 26 to the stern wall 28. This bulkhead is also fixedly secured to the bottom 21 and the top deck 30 (see FIG. 4). The bulkhead 127 thus divides the barge 14 into two longitudinally extending main compartments 128, 129. The compartment 128, adjacent the stern of the barge 14, is further divided into smaller compartments to serve functions to be described.

The first of the sub-compartments here bears the general reference numeral 130 (see FIG. 3), and this sub-compartment is defined by a pair of vertically extending bulkheads 131, 132 which extend from the bottom 21 to the top deck 30, and between the starboard side wall 24 and the bulkhead 127 to which they are rigidly connected. In providing the bulkhead 131 there is formed another sub-compartment 133 at the stern of the barge 14, this sub-compartment being defined by the bulkhead 131, the stern wall 28, and those portions of the port side wall 24 and the bulkhead 127 which extend therebetween. The sub-compartment 133 may be utilized for the storage of food, tools, apparatus, et cetera, as desired.

Reference numeral 134 indicates a substantially rectangular wall having one of its ends fixedly connected to the top deck 30, the other end thereof depending therefrom to terminate in vertically spaced relationship relative to the bottom 21. A substantially rectangular vortex control plate 136 extends forwardly from the bulkhead 131 to which one end of the plate 136 is fixedly secured, and between the lower end of the wall 134 and the port side wall 24 to which it is also fixedly connected. Extending across the vortex control plate 136 and fixedly secured thereon and to the walls 24 and 134 is an upright liquid stop plate 140. This plate must extend upwardly above all normal liquid levels within the barge 14, and thus the upper edge 142 thereof must be at least as high as the upper end 80 of the opening 74. Thus, again referring to FIG. 3 of the drawings, the plate 136, the plate 140 and that portion of the bulkhead 131 which confronts the same, and those portions of the port side wall 24 and the wall 134 extending therebetween, cooperate to form another sub-compartment here designated by the reference numeral 138.

At 144 is designated an elongated substantially rectangular weir gate which is hingedly connected at 146 (see FIG. 3) to the forward end of the control plate 136. The gate 144 is of such length as to substantially span the distance and form an entrance between the wall 24 and that portion 134' of the wall 134 which projects forwardly beyond the plate 136. The gate 144 is swingable vertically around the horizontal axis of the hinge means 146. The upper edge 148 of the gate 144 constantly remains below the upper edge 142 of the liquid stop plate regardless of the upright position of the gate 144 to serve a function to be described.

Means is provided to adjust the vertical height of the upper edge 148 of the gate 144. Any conventional means may be employed, but for the purpose of simplicity, such means are herein illustrated as comprising an elongated shaft 150 having its lower end connected by a universal connector 152 which is fixedly secured to the gate 144 adjacent its edge 148. The other or upper end of the shaft 150 extends through friction lock means 154, 156 of conventional construction and similar to the means 102, 104.

Another sub-compartment is defined by the bulkhead 131, the wall 134, 134', and a vertically extending substantially rectangular bulkhead 162 which projects perpendicularly from the bulkhead 127 to which it is fixedly secured, and it is also fixedly connected to the bottom wall 21. Preferably, this bulkhead also extends to the top deck 30 and is fixedly secured thereto. As is seen in FIG. 3, the bulkhead 162 projects in the direction of the wall 134, 134', but its adjacent edge 164 is spaced away therefrom to provide a passage therebetween. Thus it is seen that the bulkhead 162, that portion of the bulkhead 131 which confronts the same, that portion of the bulkhead 127 braced therebetween and that portion of the wall 134 which confronts the latter, serve to define the sub-compartment 166.

Still another sub-compartment 168 is provided, this compartment comprising the upright substantially rectangular bulkhead 170 (see FIG. 3) having an edge fixedly connected to the port side wall 24 at substantially right angles with respect thereto. Its opposed vertical edge 172 extends towards the bulkhead 127 but terminates in inwardly spaced relationship relative thereto to form a passage therebetween. The inner edge of a bulkhead 174 is fixedly secured to the bulkhead 170 adjacent to but spaced inwardly from its edge 172. The bulkhead 174 extends towards the bulkhead 132, but its other edge 176 terminates in spaced relationship with respect thereto to form still another passage therebetween. The bulkheads 170, 174 preferably extend between and are connected to the bottom wall 21 and the top deck 30. It is thus seen that the bulkheads 170, 174, and those portions of the bulkhead 132 and the port side wall 24 confronting the latter, respectively, define the sub-compartment 168.

Reference numeral 180 generally designates the main pump for the barge 14. The main pump 180 is fixedly mounted on the top deck 30 and includes an elongated substantially hollow cylindrical suction conduit 182 which is extended through a suitable opening 184 formed in the top deck 30, and through a similar opening 186 formed in the control plate 136. The suction conduit 182 terminates, at its lower end, in a bell 188 which opens downwardly towards the bottom wall 21, but it is spaced vertically and upwardly therefrom. The pump 180 also includes a discharge conduit 190 having its discharge end extending through a suitable opening 192 formed in the port side wall 24.

A sludge pump is generally designated by the reference numeral 192. This pump is also of conventional construction and includes a suction conduit 194 which extends through a suitable opening formed in the top deck 30 and into a sub-compartment 195 which is defined by the weir gate 144, the stop plate 140, those portions of the port side wall 24 and the wall 134 embraced therebetween, that area of the control plate 136 which is surrounded thereby. The lower end of the conduit 194 terminates in an enlarged hollow perforated housing 196 (see FIG. 4). As is seen in FIGS. 2 and 4, the housing 196 is vertically spaced above the control plate 136.

The discharge side of the pump 192 is connected to one end of a header pipe 198, the other end of the header pipe 198 being connected to suitable conventional valves 200 with branch conduits 204, 206 which extend through the top deck 30 to discharge into the main compartments 128, 129.

Having described and illustrated all of the component elements of the barge 14 in detail, the operation of the same are herein set forth below.

Assuming that the barge 14 is under way as illustrated in FIG. 1 of the drawings, the boom 12 and the barge 14 form the arms of an oil slick sweeping system, all as has been described above. The log boom 12 may, optionally, be provided with a header conduit 202 having water jet nozzles (not shown) supplied with water under pressure from a source on the barge 14, if desired. The oil slick is pushed or driven by the currents produced by the jet water streams in the direction of the port side wall 24, the oil slick moving in the direction of the apex of the system and towards the opening 74. It will be understood, of course, that the movement of the oil slick is substantially transversely of the direction of the movement of the barge 14.

It will be understood also that the plates 90, 92 have been adjusted to open the opening in accordance with the estimated oil slick thickness and the wave height. The slick or oil sludge, together with a considerable quantity of excess water, will then flow through the opening 74 into the compartment 168. This mixture then flows to and through the several sub-compartments defined above via their respective passages, as well as below the control plate 136. The bulkheads and the wall 134 serve as baffle means to quiet wave action and to prevent vortex formation below the control plate 136 in the area of the bell end 188 of the pump suction conduit 182.

As the mixture of water and its oil slick or sludge builds up in the several sub-compartments the liquid level L is controlled by adjusting the plates 90, 92, and to a limited extent, by adjusting the speed of the main pump 180. It will be understood that this pump has been placed in operation after a suitable amount of the water and its sludge has accumulated in the sub-compartments.

As continued amounts of the water and its sludge are admitted into the sub-compartment 168, and as more and more of the denser water is pumped overboard, greater amounts of the less dense oil sludge will accumulate in the other compartments to form the oil sludge level L' (see FIG. 4) and the gate 144 is adjusted to allow the sludge only to flow over its upper edge 148 and into the compartment 195 where it is picked up by the sludge pump 192 and is delivered to the main compartments 128, 129 via the header 198 and branch conduits 202, 204.

The edge 148 of the gate 144 is adjusted so that the sludge is skimmed thereover and the sludge pump 198 is actuated at a speed to maintain the sludge level L" below the liquid level L, and necessarily, below the liquid level L'. This insures delivery of the sludge, only, into the compartment 195.

The water and sludge entering the compartment 168 follows the tortuous path indicated by the arrows in FIG. 3 throughout the several described compartments. The described walls and bulkheads interposed in the path of this liquid travel serves to dampen and to substantially eliminate all wave motion, and the control plate 136 taken in conjunction therewith serves to prevent a vortex from being built up in the area immediately adjacent the bell 188. The pump 180 induces a flow of the liquid in a stream from the opening 74 past the weir gate 144 and the sub-compartment 195 and then outwardly of the barge through the conduit 190. The pump 180 thus serves the double function of enabling the liquid to move past the weir gate 144 so that the oil may pass thereover into the sub-compartment 195 and of pumping the body of water with the oil removed back into the body of water W.

Preferably, water is used as a ballast for the barge 14, and this may be carried in any of the main compartments or the sub-compartments with the exception of the sub-compartment 195. To this end, the main compartments may be provided with other bulkheads dividing them into other sub-compartments to receive the ballast water, and the latter would be pumped overboard and replaced by the oil sludge as delivered from the pump line 192 as needed.

Having described and illustrated this invention in detail, the same is now defined in the appended claims.

What is claimed is:

1. A barge for receiving and separating oil from the surface of a body of water comprising:
   a compartment within the barge defined by a bottom wall and upright side walls extending therefrom;
   an opening in one of said side walls located so as to intersect said surface of said body of water and in communication with the interior of said compartment;
   a water pump having an inlet means located within said compartment spaced apart from and below said opening, and an outlet means located exteriorly of said compartment; and
   a subcompartment within said compartment and spaced apart from said opening and defined by a bottom plate located below said opening and spaced above said bottom wall of said compartment, upright wall means connected to said bottom plate and extending upwardly therefrom above the bottom of the opening, said upright wall means having spaced apart ends defining an entrance therebetween, and gate means positioned within said entrance for limiting the flow of said body of water from said compartment into said subcompartment to the upper portion of said body of water; said opening, said water pump inlet means and said gate means being so constructed and arranged that said inlet means induces flow of said body of water through the opening into the compartment and past the gate means.

2. A barge as defined in claim 1 having means to adjust the upper end of the gate means relative to the level of the body of water comprising;
   hinge means connecting the lower end of said gate means to said bottom plate;
   an upright shaft;
   handle means on the upper end of said shaft; and
   universal connector means connecting the lower end of said shaft to said gate means.

3. A barge as defined in claim 1 further comprising:
   a second compartment; and
   an oil delivery pump having an inlet in said sub-compartment and an outlet in said second compartment for delivering the oil slick from said sub-compartment to the second compartment.

4. A barge as defined in claim 1 further comprising:
   closure means adapted to extend across said opening that includes a pair of plates slidably mounted on said one sidewall for vertical adjustment towards and away from one another to open and close said opening;
   operable means for the plates that includes a shaft for each of said plates, said shafts having one of their respective ends connected with their respective plate, means at the other ends of said shafts to effect adjustment of said plates relative to one another; and
   means cooperating with said shafts to frictionally hold said plates in adjusted relationship relative to one another.

5. A barge as defined in claim 2 and:
   a plurality of laterally spaced rods extending transversely across said opening and cooperating therewith to form a weir.

6. A barge as defined in claim 5 and:
   guide means secured on said one sidewall adjacent each side of said opening to slidably receive said closure plates therein for movement towards and away from one another.

* * * * *